No. 628,032. Patented July 4, 1899.
W. H. PHELPS.
VOTING MACHINE.
(Application filed Aug. 10, 1898.)
(No Model.) 5 Sheets—Sheet 1.
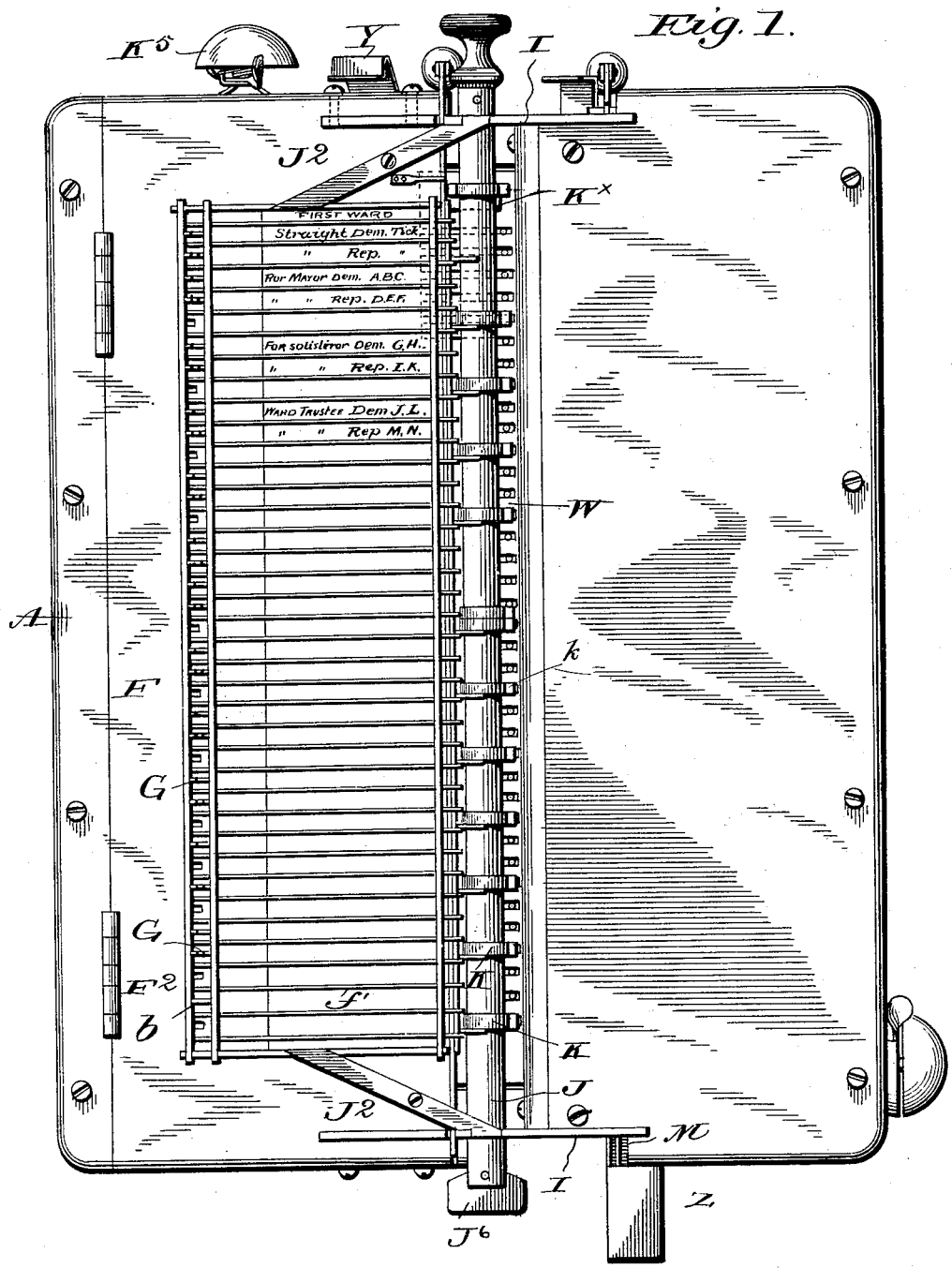

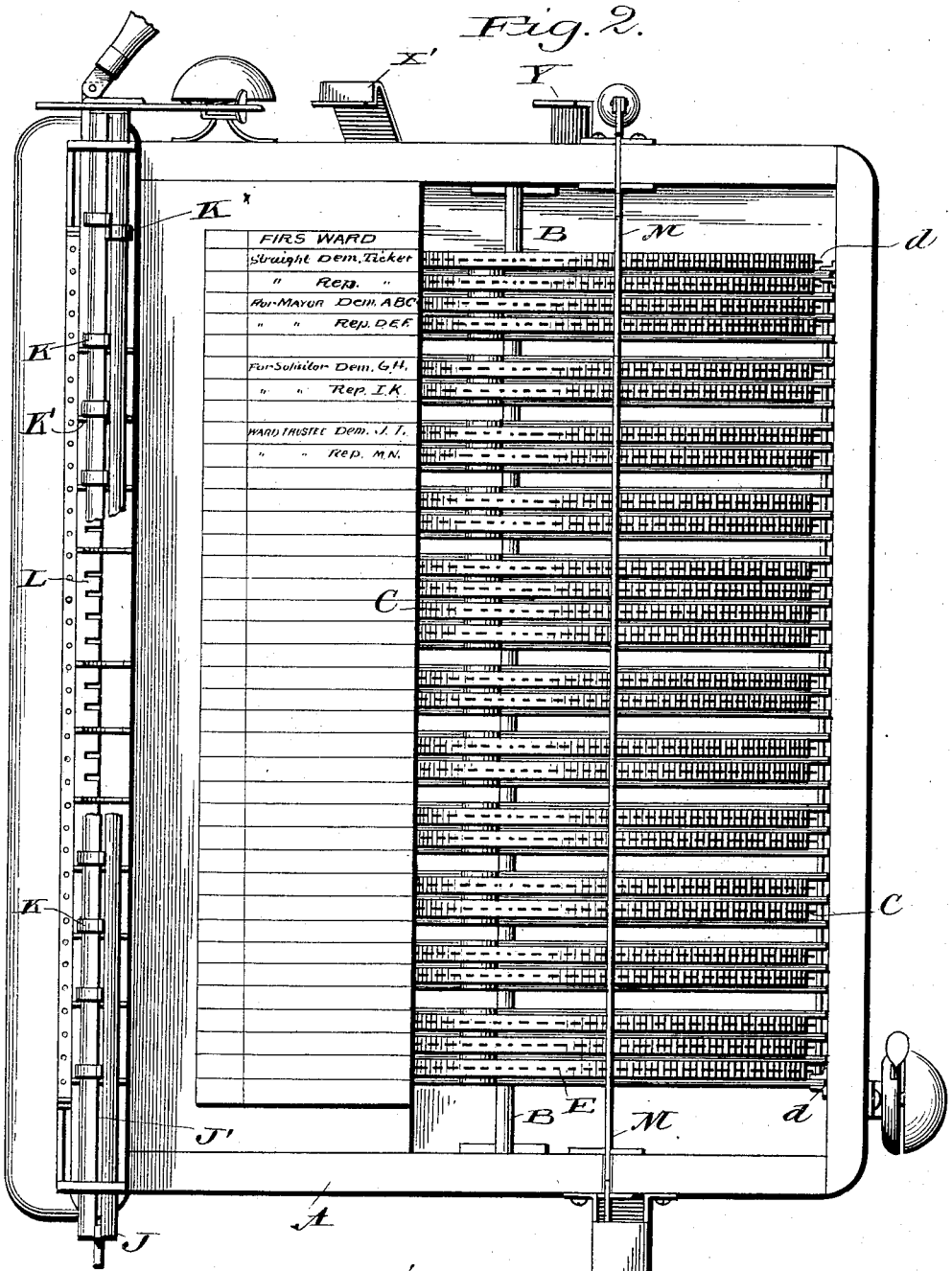

No. 628,032. Patented July 4, 1899.
W. H. PHELPS.
VOTING MACHINE.
(Application filed Aug. 10, 1898.)
(No Model.) 5 Sheets—Sheet 3.
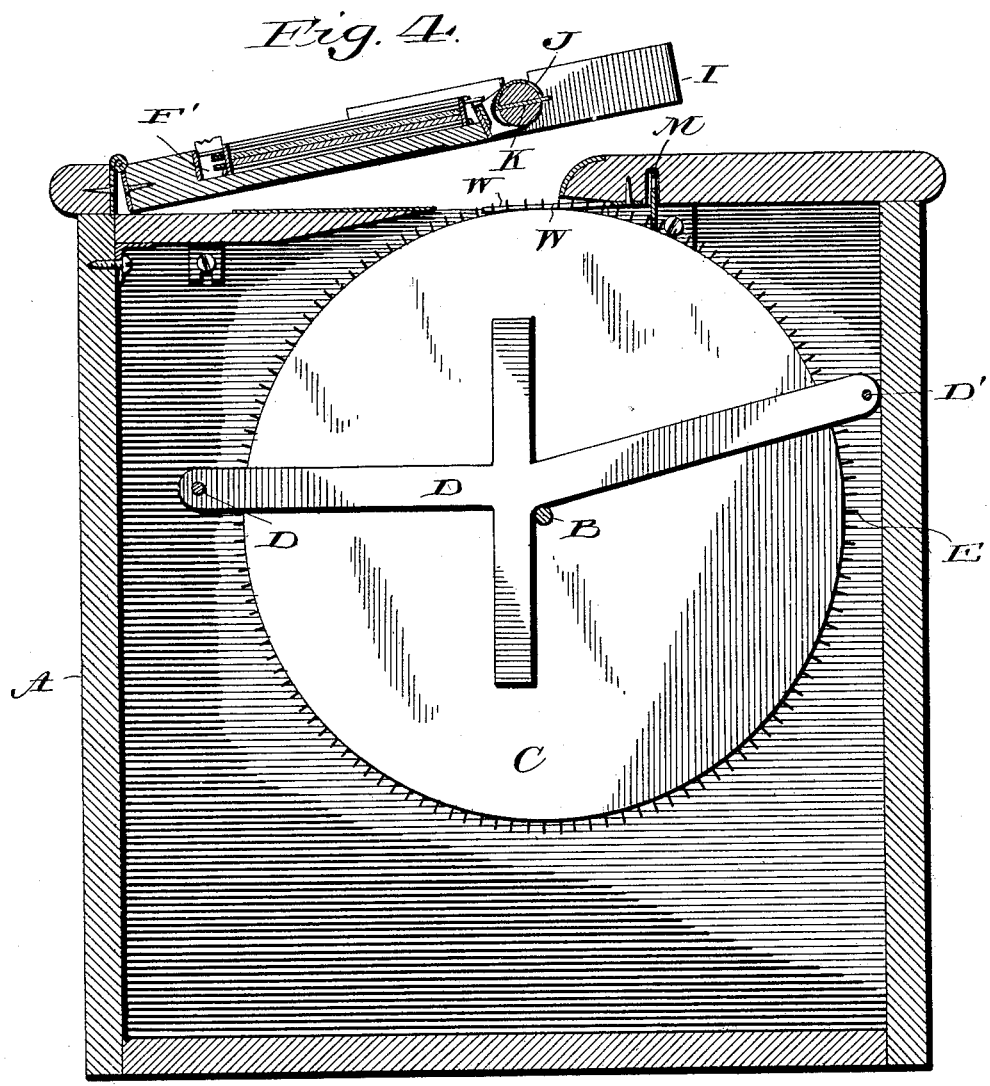
Fig. 4.
Fig. 5.
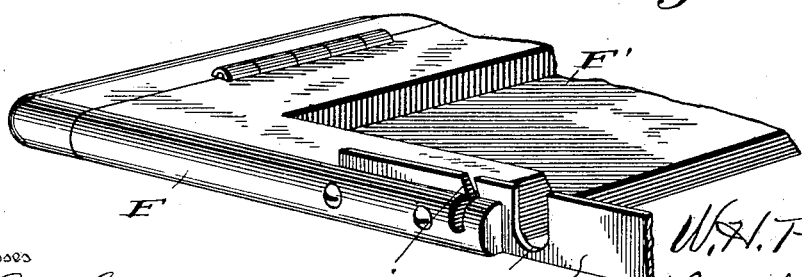
THE NORRIS PETERS CO., PHOTO-LITHO., WASHINGTON, D. C.

No. 628,032. Patented July 4, 1899.
W. H. PHELPS.
VOTING MACHINE.
(Application filed Aug. 10, 1898.)
(No Model.) 5 Sheets—Sheet 4.
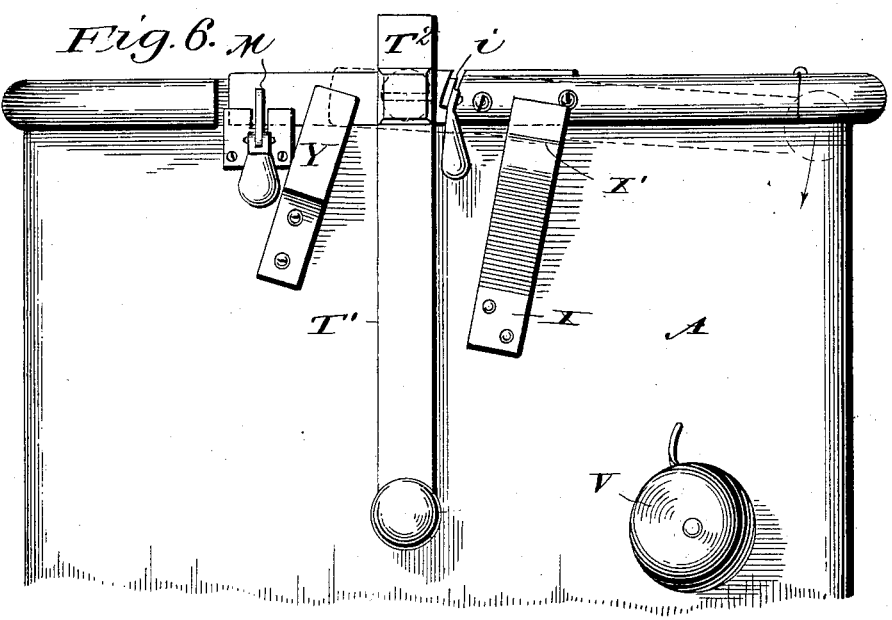
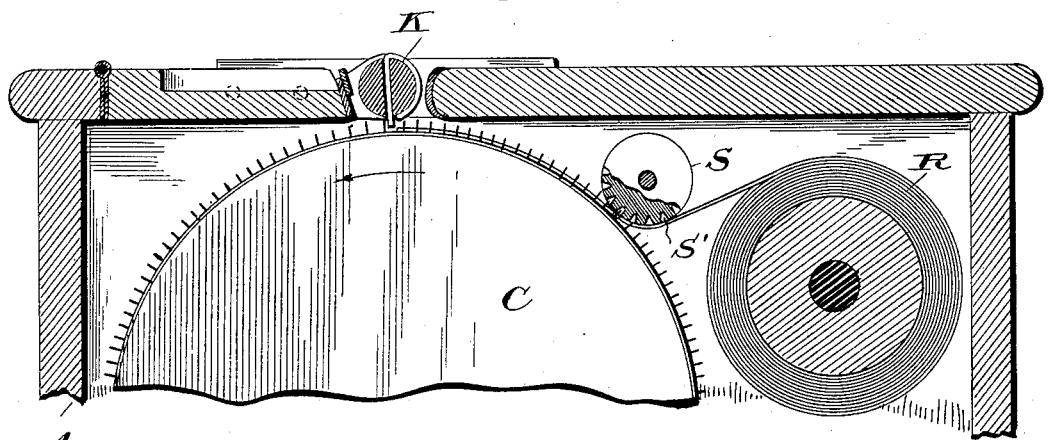
Witnesses
Inventor
W. H. Phelps,
by Franklin H. Hough
Attorney
THE NORRIS PETERS CO., PHOTO-LITHO., WASHINGTON, D. C.

No. 628,032. Patented July 4, 1899.
W. H. PHELPS.
VOTING MACHINE.
(Application filed Aug. 10, 1898.)
(No Model.) 5 Sheets—Sheet 5.
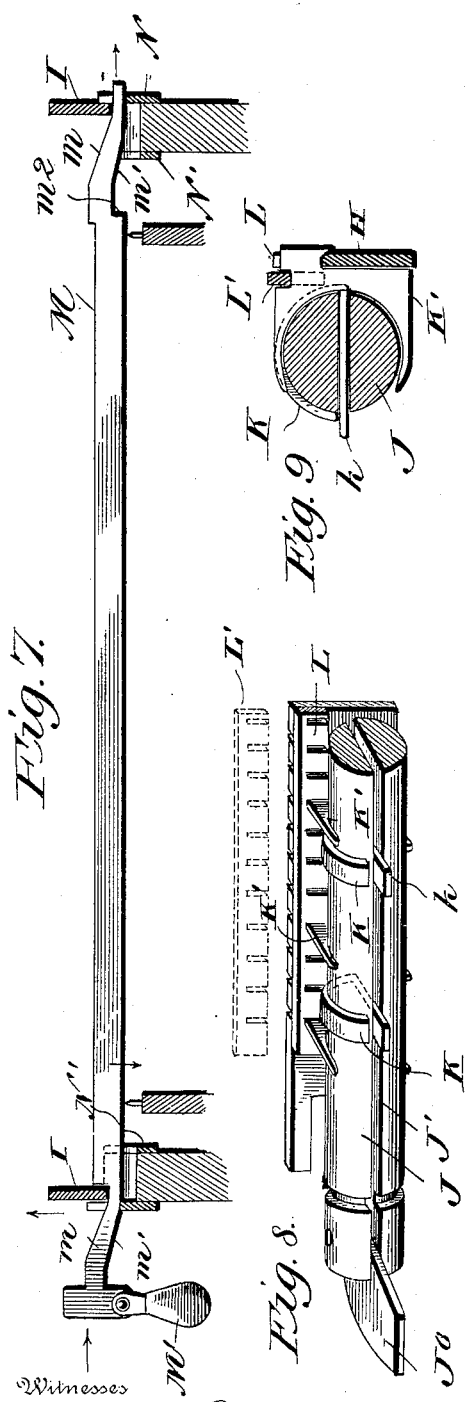
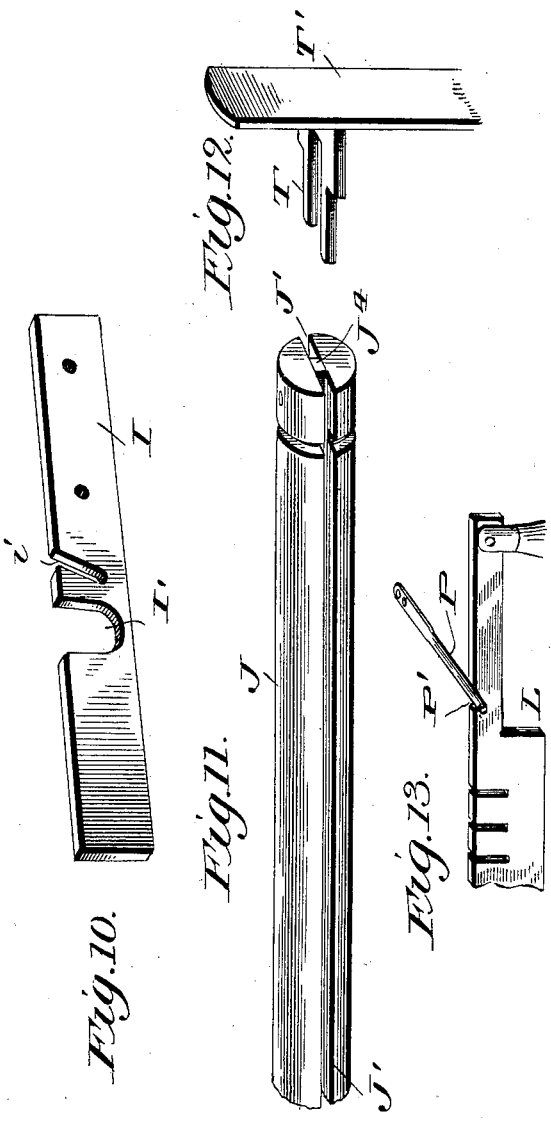

UNITED STATES PATENT OFFICE.

WALLACE H. PHELPS, OF MOUNT VERNON, OHIO.

VOTING-MACHINE.

SPECIFICATION forming part of Letters Patent No. 628,032, dated July 4, 1899.

Application filed August 10, 1898. Serial No. 688,289. (No model.)

*To all whom it may concern:*

Be it known that I, WALLACE H. PHELPS, a citizen of the United States, residing at Mount Vernon, in the county of Knox and State of Ohio, have invented certain new and useful Improvements in Voting-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in voting-machines, in which the voter determines the candidates for whom he desires to register his votes by arranging on a shaft loosely-mounted rings opposite the names of the parties for whom he desires to vote. This being done and a proper signal given the judge of the election actuates mechanism which will cause the votes to be registered on suitable registering-wheels mounted within a suitable casing out of sight of all parties, means being provided whereby the election judge can disarrange the indicating-rings after a vote is registered and before the device is adjusted for the next voter.

Another part of the present invention resides in the provision of means for preventing a registration by any person other than the judge of election by throwing out of gear the registering-wheels with the adjusting-rings, which are loosely carried on a horizontal shaft.

The invention resides, further, in the provision of a tallying attachment whereby as each vote is registered a perforation will be made in a tape, so that a comparison may be made of the votes registered and tallied for the purpose of verifying the result or total number of votes cast.

More specifically my invention consists in providing a series of registering-wheels, which are mounted on a shaft loosely and have about their circumference a series of pins, there being one such wheel provided for each candidate to be voted for. In order to actuate the registering-wheels, I provide a series of rings or indicating devices, which are loosely held on a horizontal shaft and provided with lugs or outwardly-bent ends, which are arranged opposite the names of the candidates to be voted for, said lugs or ends being adapted to strike against the pins on the various registering-wheels and cause a partial rotation to the latter as the judge of election operates the mechanism in the act of registering the votes.

To these ends and to such others as the invention may pertain the same consists, further, in the novel construction, combination, and adaptation of the parts, as will be hereinafter more fully described and then specifically defined in the accompanying drawings.

My invention is clearly illustrated in the accompanying drawings, which, with the letters of reference marked thereon, form a part of this specification, and in which drawings similar letters of reference indicate like parts throughout the several views, in which—

Figure 1 is a plan view of the machine. Fig. 2 is a plan view showing the top raised and looking down upon the registering-wheels. Fig. 3 is an enlarged detail view of a portion of the circumference of one of the registering-wheels, showing the pins and figures thereon. Fig. 4 is a cross-sectional view through the voting-machine. Fig. 5 is a detail of a portion of the cover, showing the plate for raising the cover secured thereto. Fig. 6 is an end elevation of the machine, showing the operating-crank and levers for throwing into and out of gear the registering mechanism. Fig. 7 is a detail view of the lever for raising the cover and throwing out of gear the registering mechanism and for locking the registering-wheels from rotation. Fig. 8 is an enlarged detail view of a portion of the shaft carrying the sliding rings, showing also the adjustable stops limiting the adjustment of said rings. Fig. 9 is a cross-sectional view through the shaft illustrated in Fig. 8. Fig. 10 is a detail view of the plate or bar in which one end of the shaft carrying the indicating-rings is journaled. Fig. 11 is a detail in perspective of a portion of the shaft referred to in Fig. 8, showing the parts removed. Fig. 12 is a perspective view of one end of the operating-crank, which when adjusted for use fits into the recessed end of the shaft illustrated in Fig. 11. Fig. 13 is a detail view of the shield-bar for disarranging the buttons or rings which have been adjusted by the voter for registration of his vote. Fig. 14 is a sectional view through the casing and shows a tallying mechanism in which a roll of paper is perforated by the pins on the circumference of the registering-wheels at each partial revolution of the latter. Fig. 15 is a detail view of the tallying-strip of paper, showing at the left the name of the candidate and then the registering-numerals in order.

Reference now being had to the details of the drawings by letter, A designates the box or casing, in which is mounted a shaft B, on which shaft are mounted loosely the registering-wheels C, there being a registering-wheel for each candidate and one each for the straight tickets. Between said registering-wheels are disposed washers or other members for the purpose of adjusting the distance between the wheels so that the correct registration may be effected. In the drawings I have shown a rack composed of a series of the washer members D, which are mounted at their outer ends on rods D', which rods may be suspended on brackets $d$, Fig. 2. The periphery of each of the registering-wheels carries a series of pins E, of equal distances apart, and also a consecutive series of numerals for registering the number of votes cast.

Mounted on the top of the casing is a lid or cover F, which is hinged thereto and is recessed out, as seen at F', to receive the tray $F^2$, in which tray, mounted under a piece of glass, preferably, is a ticket containing a list of all of the candidates, as well as blank spaces. This tray is disposed longitudinally in the lid and has one edge adjacent to the free edge of said lid. In the upright portions of said tray are series of perforations $f$, in which are mounted wires or strips $f'$, which separate the different names appearing on the ticket. On the longitudinal edge of said tray nearest to the hinged portion of the lid are the upright lugs G, arranged singly and in pairs, as shown, and in the upper ends of the lugs are notches G', the purpose of which notched lugs will hereinafter appear. Secured to the ends of said lid are the bars I, which are recessed, as at I', to form journals for the ends of the shaft J. This shaft is longitudinally slotted, as shown at J', and has mounted thereon the buttons or rings K, which are bent, with a curved portion extending over the convexed surface of the shaft, while one end is passed through and is guided in the slot in the shaft. This straight end extends slightly beyond the circumference of said shaft, as will be noted in the various figures of the drawings, and forms a trip, which as the button is turned in the rotation of said shaft will strike against the pins in the circumference of the registering-wheels. These buttons are allowed to slide on the shaft as far as permitted by the stops K'. For holding the shaft J in the recesses of the bars I, I provide the strips $J^2$, which are secured to the lid, and their outer ends rest on the shaft, while their inner ends engage with the tray and serve to hold it in the recess provided to receive same.

The stops K' are mounted in slots or recesses L in the bar $L^2$ and are held in place by means of the toothed plate L', which fits down over the said stops, as seen plainly in Fig. 8 of the drawings. It will be observed by this provision that said stops may be placed in the various recesses in the bar $L^2$, farther or nearer apart, as may be desired, to limit the movement of the buttons.

Directly underneath the ticket, which is carried in the tray on the lid, is a duplicate ticket having the names of the candidates arranged in same order and registering opposite similar registering-wheels. If desired, the under surface of the lid may be recessed out, as shown in Fig. 4, to allow the lid to close over the under ticket.

Mounted longitudinally in the fixed top portion A' of the box is the lever M. (Shown clearly in Fig. 7.) This lever is provided with a handle M' at one end and slides longitudinally on the plates N and N', the inner of which plates N' are disposed in a lower plane than the outer plates N. This lever has two beveled edge portions $m$ near its ends, on which the free ends of the bars I normally rest, and the opposite edges of the lever, near its ends, are also slanting, as seen at $m'$, and a shoulder $m^2$ at one end of said lever limits its inward movement. As this lever is pushed in by means of the handle it will be noted that the bars I, which are secured to the lid, will be raised up a trifle to such an extent that the outwardly-projecting ends $k$ of the buttons will be out of the path of the rotatable registering-wheels, and at the same time the under edge of the lever will be forced down between a series of pins in the row of registering-wheels, thus serving as a lock to prevent a registration until intended by the inspector or judge of the election-box. The reverse movement of the lever returns the lid to its normal position, and the lever rises out of the path of the pins, and the apparatus is in readiness for a registration.

The bar $L^2$ before referred to has connected to its outer end a handle $L^3$, and secured to the lid at any suitable location is a spring-strip P, the free end of which is designed to engage in a notch P' in said bar, this spring being provided for the purpose of returning to its normal position said bar $L^2$, when a quick forward-and-backward movement is imparted to the latter for the purpose of disarranging the buttons, so that the next voter may not know for which candidates the preceding voter registered his vote.

In Fig. 14 I have shown a tallying mechanism in which is wound in a roll R paper which contains at its outer end the name of the candidate whose votes it is desired to tally, as shown in Fig. 15. This strip of paper is fed about the circumference of the registering-wheel C. S is a die-wheel mounted within the casing on a shaft and has a series of peripheral recesses S', in which the pins are forced through the strip of paper as the latter passes through between the recesses and the points, as illustrated. Each time the registering-wheel is caused to make a partial revolution, as when a vote is registered, a hole will be punched in the paper, and when the voting is finished the strip may be removed and a comparison made between the votes registered and the tallies. This attachment may be dispensed with, however, if desired, or easily attached to any register embodying the other features of my invention.

The outer end of the shaft carrying the buttons has a guide-piece $J^4$, which the forked portion T of the crank T' engages when it is desired to rotate the shaft J.

V is a signal-bell against the spring-hammer of which the handle end of the crank strikes as the crank is swung in the direction of the arrow in the act of making a registration of a vote. Secured to the end of the casing is a bracket X, having a shoulder X', on which the crank may rest, as shown in dotted lines in Fig. 6, when in which position it is desired to force in the end of the lever M to lock the register from further registration the operator may press gently down on the handle end of the crank, which will serve to raise the bars I off from the lever M and allow the latter to push in easily for the purpose of holding up the free edge of the lid above the pins in the registering-wheels and to lock the latter from rotation. In order to prevent any person tampering with the opposite end of the lever M, I have placed a boxing X about said end, which projects out of the casing. A bracket or guide Y is secured to the end of the casing, which serves to hold the end $T^2$ when in the position shown in dotted lines in Fig. 6. A bell $K^5$ is placed upon the opposite end of the casing for the purpose of giving a signal to the election judge that the voter has arranged the buttons and the machine is in readiness for the operator to cause the registration to be made.

The operation of the machine is as follows: A ticket containing the names of the candidates and blank spaces is placed in the tray, as shown in Fig. 1 of the drawings, and preferably under glass, so as to afford protection to the ticket. This ticket is so arranged in the tray that the names of the candidates will come between the wires $f$ in the tray. Between each of the stops K' is placed on the shaft J a button, which may be slid back and forth in the space limited by the stops and may be located opposite the end of the name of the candidate for whom the voter wishes to have his vote registered. He may arrange these buttons the entire length of the shaft between the stops and opposite the various candidates for whom he wishes to vote, and if he desires to register a blank vote he can do so by pushing a button opposite a blank space. When he has arranged the buttons in readiness to cause registrations to be made when the shaft carrying the buttons is rotated, he (the voter) rings the bell $K^5$, which gives the signal to the supervisor or judge of the election, and the latter first pulls out the lever M, which puts the mechanism in readiness to register as soon as the operator turns the crank in the direction indicated by the arrow. As the handle end of the crank passes the bell V a signal is given that the registration is being made, which latter is accomplished as the ends $k$ of the buttons strike against the pins in the circumferences of the registering-wheels. When the registering has been effected and the crank-operating handle is in the position shown in dotted lines in Fig. 6, the operator (the inspector or judge of election in charge of the election) presses down on the handle of the crank and pushes in the end of the lever M, and the registering-wheels are locked.

When it is desired to vote a straight ticket, the voter may turn the shaft J a one-half revolution by means of the turning-piece $J^6$, which will turn all of the buttons, so that their projecting ends $k$ will be out of the path of the pins on the registering-wheels, with the exception of one button $K^\times$, which is the button nearest the end of the shaft on which the operating-crank is attached. This latter-mentioned button has a lug on the opposite side from any of the other buttons, and when this button with the lug diametrically-oppositely arranged is adjusted opposite the straight ticket sought to be registered, and when the operating-shaft is operated, it will be noted that but this one button will cause a registration.

In order to prevent the voter from seeing the total number of votes registered for each party and candidate, as would appear from the circumference of the registering-wheels, I provide the toothed plate or strip W, which obscures the numerals from the view of the voter and still leaves sufficient room to allow the wheels to rotate.

When the tallying apparatus is utilized, it will be observed that each time the registering-wheel makes a partial revolution a perforation will be made in the paper, which is wound up on the large wheel.

The lugs G, hereinbefore referred to, are for the purpose of assisting a blind voter to locate the names of the candidates for whom he desires to register his vote, and, if desired, different colors may be placed opposite the different candidates for guidance for illiterate people who desire to register their votes.

When a voter desires to cast a "scattered" vote, extra ballots printed from the same form of type used for the ticket on the ballot-box will be provided, whereby the voter may cross off or add new names in the blank spaces, which tickets the inspector or judge of the election may cause a registration to be made of by setting the "straight-ticket" ring or button opposite the blank space, then turning the crank, the only wheel thus actuated being the one registering the number of votes cast by all parties.

From the foregoing it will be noted that a voting-machine is provided whereby the voter may readily arrange the buttons to indicate the candidates for whom he desires to vote in readiness to have the registration effected by the judge, and said voter cannot vote twice or tamper in any way with the mechanism, and at the end of the election the number of votes registered and tallied may be determined and compared.

If it is desired, the top of the one registry-wheel may be exposed to view in order that the number of votes cast up to any hour of the day may be determined at a glance.

Having thus described my invention, what I claim to be new, and desire to secure by Letters Patent, is—

1. A voting-machine, consisting of a casing, registering-wheels mounted therein, a shaft carrying buttons, which are adapted to engage with projections on said registering-wheels as the shaft is rotated to effect the registration, as set forth.

2. In a voting-machine the casing, the registering-wheels mounted therein, projections about the circumference of said wheels, a shaft having loosely mounted thereon buttons, provided with projections which are adapted to engage as the shaft is rotated with the projections on the wheels, and stops to limit the movement of said buttons on the shaft, as set forth.

3. In a voting-machine, the casing, the shaft and registering-wheels mounted thereon, a series of projections about the circumferences of said wheels, a shaft and buttons loosely mounted thereon, stops to limit the movements of said buttons, a ticket containing the names of the candidates mounted adjacent to said shaft carrying the buttons, and guide-rods for use in adjusting said buttons on the shaft opposite the circumferences of the registering-wheels and means for rotating said shaft.

4. In a voting-machine, the casing, the shaft mounted therein and registering-wheels carried thereon, projections about the circumferences of the registering-wheels, combined with a hinged lid, the shaft carried thereby, the ticket and tray carrying the same, buttons on said shaft carried by the lid adapted to strike the projections on the registering-wheels to effect registration, and means for operating the same.

5. In a voting-machine the casing, the shaft and registering-wheels carried thereby, having circumferential series of pins therein, the lid hinged to the said casing, the shaft mounted thereon, the buttons on said shaft, adjustable stop-strips carried by the lid, whereby the longitudinal movement of the buttons on said shaft may be limited, and means for indicating the candidate to be voted for, as set forth.

6. In a voting-machine, the combination of the casing, the registering-wheels and shaft carrying the same, washers between the wheels, the lid hinged to the casing, the tray seated in a recess of the lid and containing the ticket to be voted for, guide-rods in the tray, the indicating notched lugs on the tray, the rotary shaft and loosely-mounted buttons thereon and the stop members, and means for operating the same.

7. In a voting-machine, the combination of the casing, the shaft and registering-wheels carried therein, the rack mounted in the casing and having washer members secured thereto, and disposed between the registering-wheels, projections about the peripheries of the registering-wheels, also a series of numerals, the hinged lid, the rotary shaft with loosely-mounted buttons thereon having projections extending beyond the circumference of the shaft carrying the same, the tray, stop members, and means for actuating the mechanism.

8. In a voting-machine, the combination with the casing, the registering-wheels, shaft carrying the same, washer members between the registering-wheels, the hinged lid, the shaft carried thereby and the buttons loosely mounted thereon, stop members and means for raising the lid out of engagement with the registering-wheels, as set forth.

9. In a voting-machine, the combination with the casing, the registering-wheels with projections about their circumferences, the hinged lid and a slide adapted to simultaneously raise the lid and form a stop against the projections of the registering-wheels, and means for operating the same, as set forth.

10. In a voting-machine the combination with the registering-wheels mounted as described in a suitable casing, the lid pivoted to said casing and the rotary shaft with loosely-mounted buttons thereon, a longitudinally-movable slide having opposite beveled edges designed as it is moved longitudinally to raise the lid and to form a stop between the projections on the registering-wheels, as set forth.

11. In combination with the registering-wheels and casing as set forth, the fixed top to the casing, the pivoted lid, the rotary shaft and buttons carried thereon, the longitudinally-movable slide having oppositely-beveled edges and shouldered near one end, and plates secured to the casing in different planes on which said lever is adapted to work, whereby the lid may be raised and the stop afforded to the registering-wheels as set forth.

12. In combination with the registering-wheels mounted in the casing as set forth, the lid hinged thereto, the tray carrying the tickets, the guide-wires therein, the rotatable shaft, the buttons carried thereon, the stop members and plate carrying the same and the adjustable toothed plate fitted over said stops and means for operating the mechanism, as set forth.

13. In combination with a voting-machine having the registering-wheels in a casing as set forth, the hinged lid in the casing, the shaft and buttons loosely mounted thereon, stops to limit the movements of the buttons, said shaft being longitudinally slotted and adapted to receive and guide said buttons, and means for operating the shaft, as set forth.

14. In a voting-machine, the combination with the casing, the registering-wheels and shaft mounted therein, series of pins about the circumferences of said registering-wheels, a lid hinged to the casing, a shaft loosely mounted thereon, buttons carried by the shaft, the longitudinally-movable bar and stops carried thereby, and means for operating the device.

15. In a voting-machine, the combination with the casing, the registering-wheels and shaft carrying the same, a series of pins about the circumferences of the registering-wheels, a hinged lid and strips secured thereto, the rotatable shaft mounted in said strips, the buttons loosely mounted on the shaft, the notched and longitudinally-movable bar L, the stops held in said notches and a movable notched bar adapted to hold the upper ends of the said stops, and means for operating the mechanism, combined as set forth.

16. In a voting-machine, the combination with the casing carrying the registering-wheels described, the hinged lid and rotatable shaft with buttons thereon, the bar L and stops carried thereby said bar being provided with a handle at one end and longitudinally movable, and a spring-strip adapted to return the said bar to its normal position after a longitudinal play has been imparted to the same as set forth.

17. In combination with the registering mechanism described the shaft with buttons mounted thereon, said shaft having a slotted end, the operating-crank having a forked projection adapted to engage in the end of the said shaft to rotate the same, and sound the signal as set forth.

18. In combination with the voting-machine having the registering mechanism therein, the pivoted lid and rotatable shaft with buttons thereon, the end of said shaft being slotted, the operating-crank having forked member adapted to be inserted in said slotted end, the brackets mounted on the ends of the casing, one of which acts as a fulcrum, whereby the lid may be slightly raised, and the slide mounted in the casing designed to simultaneously lock the registering-wheels, and slightly raise the buttons out of the paths of the pins carried by the registering-wheels, as set forth.

In testimony whereof I affix my signature in presence of two witnesses.

WALLACE H. PHELPS.

Witnesses:
J. R. VAN VOORHIS,
HARRY W. BLAIR.